Jan. 25, 1955  K. W. JAY  2,700,394
FLOW DISTRIBUTOR VALVE
Filed Jan. 6, 1951
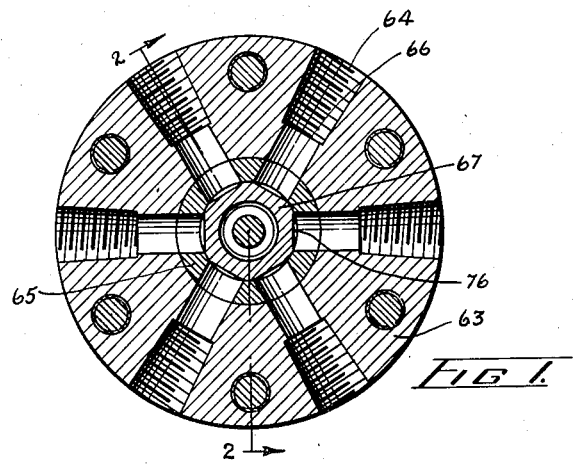
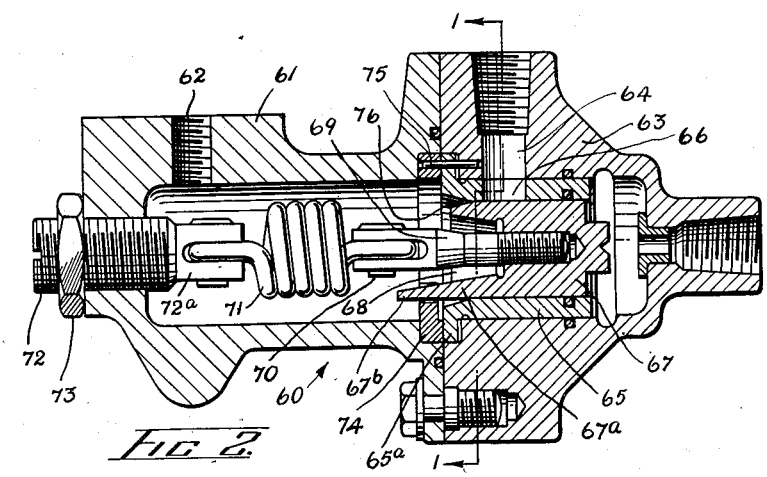
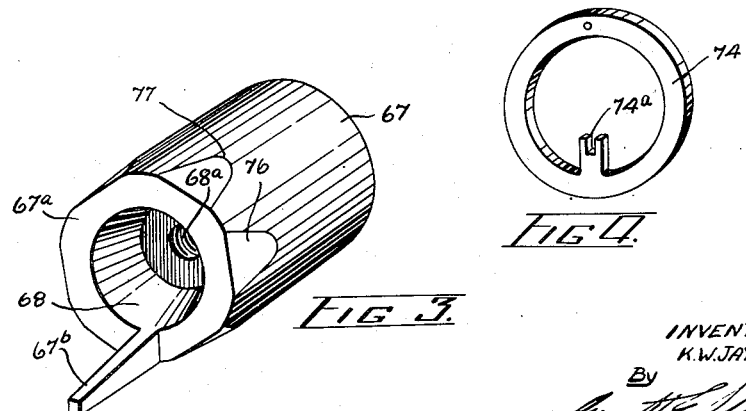
INVENTOR
K. W. JAY
By
ATTORNEY.

United States Patent Office 2,700,394
Patented Jan. 25, 1955

2,700,394

FLOW DISTRIBUTOR VALVE

Kenneth William Jay, Weston, Ontario, Canada, assignor to A. V. Roe Canada Limited, Malton, Ontario, Canada, a corporation Application January 6, 1951, Serial No. 204,713

2 Claims. (Cl. 137—118)

This invention relates to improvements in flow distributor valves, and more particularly to improvements in the valve disclosed in co-pending application Serial No. 168,704 dated June 17, 1950, by Winnett Boyd, R. G. Meschino and K. W. Jay, now Patent 2,664,910, dated January 5, 1954.

The main object of this invention is to provide a variable orifice distributor valve which may be readily manufactured to the high order of accuracy required for uniform distribution at all supply pressures and to attain such accuracy by the interaction of simple surfaces and round holes which lend themselves to straightforward manufacturing processes. Other objects and advantages of the invention will be apparent during the course of the following description.

In the accompanying drawings forming a part of this application and in which like reference characters designate like parts throughout the several views:

Fig. 1 is a transverse sectional view of a distributor valve constructed according to this invention and taken on the line 1—1 in Fig. 2;

Fig. 2 is a longitudinal sectional view of the valve taken on the line 2—2 in Fig. 1; and Fig. 3 is a perspective view of the flow regulating piston of the valve.

Fig. 4 is a perspective view of a ring forming part of the valve.

By reference to the aforesaid patent, it will be recognized that the preferred construction of the general features of the valve according to this invention is similar to that disclosed in the said patent. The body 60 of the valve comprises an inlet part 61 provided with an inlet passage 62 secured to an outlet part 63 provided with six outlet passages 64. Internally mounted within the outlet part 63 is a liner 65 having circumferentially disposed circular ports 66 which register with the outlet passages 64. The position of the liner 65 is fixed longitudinally by the flange 65ª on the liner which flange fits into an annular recess in the outlet part 63. A piston 67 is slidably mounted within the liner 65; the piston has a truncated conical recess 68 defined by a piston skirt 67ª and terminating in a threaded recess 68ª.

One end of the piston rod 69 is threaded into the piston 67 and protrudes through the piston skirt 67ª, and the other end of the piston rod is attached by a pin 70 to one end of the coil spring 71. The coil spring is suitably fastened at its other end to a fork-end 72ª of an adjusting screw 72. The fork-end 72ª of the adjusting screw is swivel mounted so that rotation of the screw during adjustment will not tend to twist the spring or to unscrew the piston rod in the piston. The adjusting screw is threaded in a tapped hole in the end wall of the inlet part 61 and is provided with a lock nut 73.

A ring member 74 is mounted in an annular recess in the inlet part 61 and faces the liner flange 65ª. A dowel 75 passing through a hole in the ring member 74 and through the liner flange 65ª into the outlet part 63, prevents rotation of the ring and of the liner relative to the outlet part, and positively maintains the registration of the ports 66 with the outlet passages 64. The piston 67 is provided with a tongue 67ᵇ which slides in a guide 74ª mounted in the ring member 74 to prevent rotation of the piston about its axis relative to the body of the valve.

It will be seen by reference to Fig. 3, that there are no V-slots in the piston skirt 67ª, as disclosed and claimed in the above-mentioned patent; according to this invention the slots are replaced by a series of inclined depressions 76 disposed around the periphery of the skirt; in the preferred construction the inclined depressions 76 are flat surfaces of segmental elliptical form. The major axis of each flat surface is maintained by the arrangement of the tongue 67ᵇ and guide 74ª, in positive longitudinal alignment with the centre of one of the ports 66 in the liner.

The segmental elliptical flat surfaces 76 are preferably machined on the piston so that they are accurately flat and the major axis of each intersects the axis of the piston at a common point and at an equal acute angle. It follows that the vertices 77 of all the flat surfaces lie in a radial plane perpendicular to the axis of the piston; that is, that one such radial plane is tangential to all the elliptical lines of intersection of the flat surfaces and the cylindrical, peripheral surface of the piston.

In operation the pressure of the fuel entering the valve causes the piston 67 to move to the right (with respect to its position in Fig. 2) against the restraining influence of the spring 71. As this movement takes place the vertices 77 of the inclined depressions 76 come into registration with the outlet ports 66 and a progressive increase of the supply pressure will cause the inclined depressions to be progressively exposed to the outlet ports allowing a controlled quantity of fuel to flow to the outlet passages 64. In the preferred construction described the effective area of each flow regulating orifice is bounded in part by the common chord of the port 66 and the elliptical outline of the flat surface 76 and in part by the projection of the uncovered edge of the port on a plane containing the said common chord and at right angles to the flat surface.

It will be understood that in the preferred construction described the accurate manufacture of the flow regulating devices, namely the flat surfaces 76 of the piston, can be very readily performed and any minor adjustment required after the first calibration tests can be effected by the simple operation involved in polishing a flat surface. Furthermore the characteristics of the valve can be altered to suit the flow requirements by the alteration of the inclined depressions so that they assume either a simple concave or convex form or a combination of these forms.

What I claim as my invention is:

1. A pressure responsive flow distribution valve for the precise and equal distribution of liquid from a main conduit to a plurality of branch conduits comprising, a body containing a generally cylindrical chamber having a side wall and an inlet end, an inlet passage in the body communicating with the main conduit and leading into the inlet end of the chamber, a plurality of outlet passages in the side wall of the body each communicating with one of the main conduits, a cylindrical liner in the chamber having a plurality of outlet ports each disposed in registration with one only of the outlet passages, a cylindrical piston slidable in the liner and having a skirt at the end of the piston facing the inlet end of the chamber, the skirt of the piston constituting a hollow extension, toward the said inlet end of the cylindrical periphery of the piston, said piston being actuatable toward the other end of the chamber by fluid under pressure in the inlet passage, and a helical spring in the chamber connecting the piston to the body and urging the piston toward the said inlet end of the chamber to a position in which the peripheral surface of the piston closes the said outlet ports, the end of the piston skirt being flat and having a plurality of obliquely disposed flat sectional surfaces disposed around its periphery and intersecting the said flat ends, each of the said surfaces being a segment of an ellipse and having a major axis disposed in an axial plane of the piston and in longitudinal alignment with one only of the outlet ports, each of the said surfaces being inclined at the same acute angle to the axis of the piston, movement of the piston away from and toward the inlet passage providing progressively greater and lesser flow-conducting channels bounded by the said surfaces and the wall of the chamber and leading to the outlet port.

2. A pressure responsive flow distribution valve for the precise distribution of liquid from a main conduit to a plurality of branch conduits comprising, a body containing a generally cylindrical chamber having an inlet end and a side wall in which is provided an annular recess, a guide ring in the recess, an inlet passage in the body communicating with the main conduit and leading into the inlet end of the chamber, a plurality of outlet passages in the body each communicating with one of the branch conduits, a cylindrical liner in the chamber having a plurality of outlet ports each disposed in registration with one only of the outlet passages, rigid members locking the ring and the liner to the body for preventing relative rotation between the ring and the liner and the body, a cylindrical piston slidable in the liner and having a skirt at the end of the piston facing the inlet end of the chamber, the skirt of the piston constituting a hollow extension, toward the said inlet end, of the cylindrical periphery of the piston, said piston being actuatable toward the other end of the chamber by fluid under pressure in the inlet passage, a tongue extending from the said end of the piston and slidably positioned in the guide ring to prevent rotation of the piston around its longitudinal axis, and a helical spring in the chamber connecting the piston to the body at the said inlet end of the chamber and urging the piston toward the inlet passage to a position in which the peripheral surface of the piston closes the said outlet ports, the end of the piston skirt having a plurality of obliquely disposed flat sectional surfaces disposed around its periphery, each of the said surfaces being a segment of an ellipse and having a major axis disposed in an axial plane of the piston and in longitudinal alignment with one only of the outlet ports, each of the said surfaces being inclined at the same acute angle to the axis of the piston, movement of the piston away from and toward the inlet passage providing progressively greater and lesser flow-conducting channels bounded by the said surfaces and the wall of the chamber and leading to the outlet ports.

References Cited in the file of this patent

UNITED STATES PATENTS

| | | |
|---|---|---|
| 1,150,743 | Butts | Aug. 17, 1915 |
| 1,390,897 | Flory | Sept. 13, 1921 |
| 2,011,333 | Clifton | Aug. 13, 1935 |
| 2,147,845 | Kistnek | Feb. 21, 1939 |
| 2,516,825 | Hejduk | July 25, 1950 |
| 2,536,440 | Greenland | Jan. 2, 1951 |

FOREIGN PATENTS

| | | |
|---|---|---|
| 834,708 | France | Aug. 29, 1938 |